Jan. 30, 1945.     H. A. STILSON     2,368,581
ANIMAL TRAP
Filed May 8, 1944
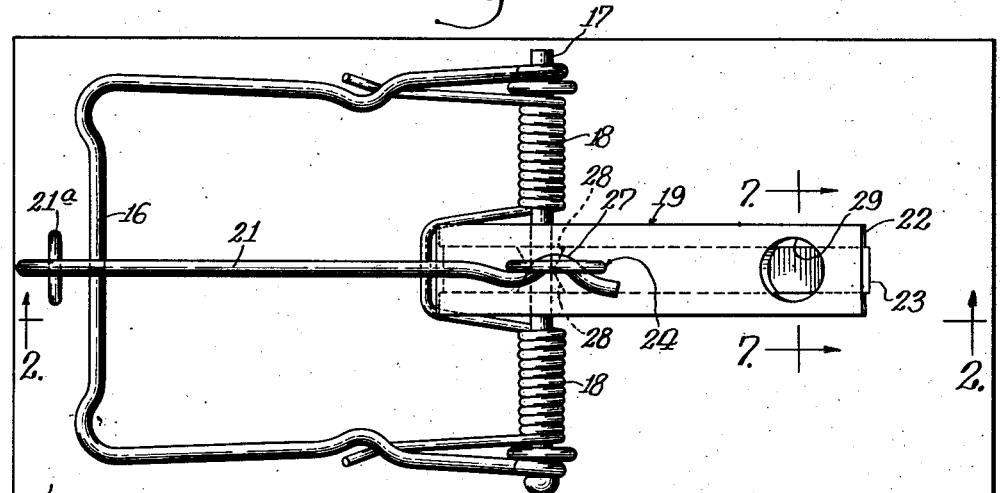
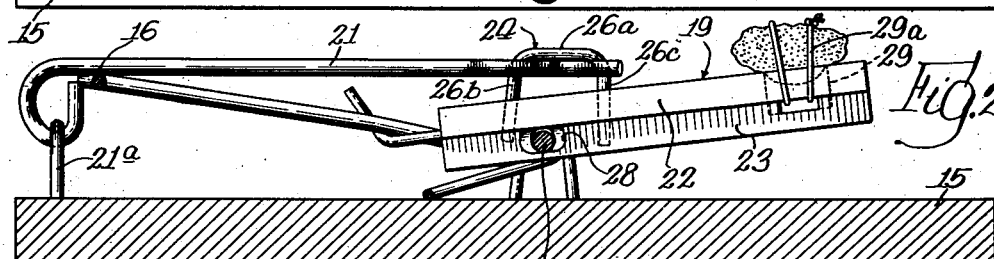
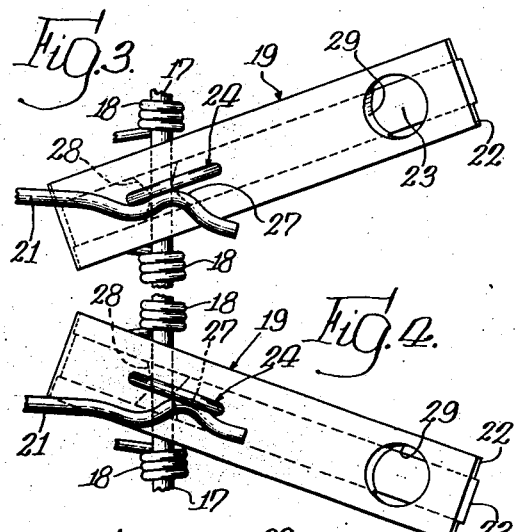
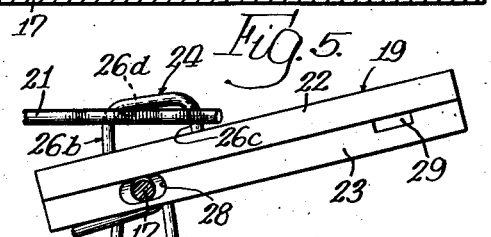
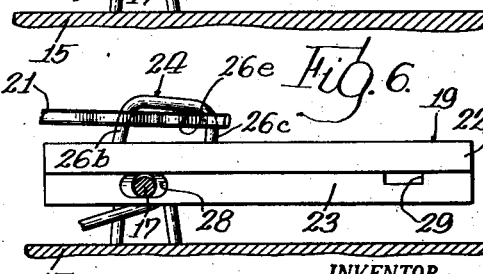
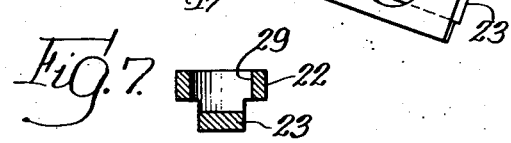
INVENTOR.
Herbert A. Stilson,
BY
Mueller, Dodds & Mason
Attys.

Patented Jan. 30, 1945

2,368,581

UNITED STATES PATENT OFFICE 2,368,581

ANIMAL TRAP

Herbert A. Stilson, Chicago, Ill., assignor to McGill Metal Products Corporation, Marengo, Ill., a corporation of Illinois Application May 8, 1944, Serial No. 534,592

7 Claims. (Cl. 43—81)

The present invention relates to animal traps, and more particularly to an improved bait treadle of wood construction for a mouse trap. This application is a continuation in part of co-pending application Serial No. 467,580, filed December 2, 1942.

It is an object of this invention to provide an improved bait treadle for an animal trap.

It is another object of the invention to provide an improved bait treadle for an animal trap, which is of substantially all wood construction, is of a rugged and simple form, and yet is sensitive and positive acting in its operation to release an associated latch to spring the trap.

It is a still further object of the invention to provide an improved wooden bait treadle for a mouse trap, which is of one-piece construction and in which integral parts of the treadle are utilized to support the treadle upon a transverse supporting bar of the trap for pivotal movement relative to the bar in one direction and limited swinging movement relative to the bar in another direction.

In accordance with another object of the invention, an elongated wooden bait treadle is provided, which has an improved cross-sectional configuration such that a supporting opening may be formed in a particular portion thereof to permit the desired unrestricted four-way pivotal release movement of the treadle, without permitting substantial longitudinal movement of the treadle.

According to still another and more specific object of the invention, the cross-sectional configuration of the treadle and the configuration of the supporting opening through the treadle are such that the cross-sectional dimensions of the treadle may be made small, and the supporting opening may be easily formed with a minimum number of cutting operations.

It is a still further object of the invention to provide a wood bait treadle of the character described having a cross-sectional configuration which permits a simple bait receiving opening to be provided therein for securely anchoring the bait against theft without release of the trap.

Further objects, features, and advantages of this invention will become apparent from the following description when taken in connection with the accompanying drawing in which:

Fig. 1 is a plan view of a complete trap assembly embodying one form of the present improved bait treadle, the trap being shown in a set position;

Fig. 2 is a longitudinal section view as seen along the lines 2—2 in Fig. 1;

Figs. 3, 4, 5 and 6 are fragmentary views graphically illustrating the four-way pivotal latch release movement of the bait treadle; and Fig. 7 is a transverse sectional view taken along the lines 7—7 in Fig. 1.

In the illustrated embodiment of the invention, the present improved bait treadle is utilized in a mouse trap to cooperate with the usual pivotally supported latch for the purpose of releasably restraining the spring biased striker bar or jaw of the trap in a set position. This treadle is of elongated one-piece wood construction, is T-shaped in cross section throughout its length, and at its free or operating end is provided with a bait receiving opening which extends downward from the top surface of the upper transverse portion of the T, so that the lower end of the opening is only partially blocked by the vertical rib portion of the T. At its opposite end, the lower vertical rib portion of the T-shaped treadle is provided with a transverse opening within which the spring coil supporting bar extending transversely of the trap is received. This opening has cross-sectional dimensions which are greater than the cross-sectional dimensions of the transverse bar and are shaped and proportioned to provide a restricted central portion spreading or flaring out in opposite directions into oppositely disposed bores. The entire opening is such that the bores are each generally wider in a direction longitudinally of the treadle at the mouth of the bore than at the central portion of the opening. This configuration permits limited swinging movement of the treadle in an arcuate path relative to the transverse bar and in a plane substantially parallel to the plane occupied by the striker bar or jaw of the trap when the trap is set.

Referring now more particularly to the drawing, the present improved bait treadle is illustrated as being embodied in a mouse trap having a base 15, and a striker bar or jaw 16 pivoted on a transverse supporting bar 17 carried by the base. The striker bar 16 is adapted to be actuated from the illustrated set position thereof to its released position by means of a pair of spring coils 18 which are mounted upon the transverse bar 17 in spaced-apart relationship therealong. A bait treadle indicated generally at 19 and characterized by the features of the present invention, is releasably engageable with the free end of a pivoted latch 21 to releasably hold the striker bar 16 in a set position. The opposite end of the latch 21 is pivotally connected to a staple 21a which is driven into the wooden base 15.

In brief, the elongated treadle 19 is of one-piece wood construction and is of substantially T-shaped cross-sectional configuration throughout its length, such that it comprises an upper transverse portion 22 and a lower vertical rib portion 23. Intermediate its ends but adjacent the left end thereof, the vertical rib 23 of the treadle is provided with a transverse opening therethrough, within which the central portion of the transverse bar 17 is received to provide a pivotal connection between the two identified parts 17 and 19. As best shown in Fig. 2 of the drawing, the cross-sectional dimension of the opening 28 in a direction vertically normal to the longitudinal axis of the treadle 19 is uniform throughout the length of the opening and is only slightly greater than the corresponding dimension, i. e. the diameter, of the transverse bar 17. Likewise, at the longitudinal center of the opening 28, the cross-sectional dimension of the opening in a direction longitudinal of the treadle only slightly exceeds the diameter of the transverse bar. Thus, at the longitudinal center of the opening 28 the cross-sectional dimensions of the opening are such as to prevent substantial movement of the treadle 19 bodily in a longitudinal direction. Such movement is undesirable since it tends to reduce the sensitivity of the latch release action.

In order to permit swinging or arcuate movement of the treadle 19 relative to the bar 17 in a plane parallel to the plane occupied by the striker bar 16 when the trap is set, the cross-sectional dimension of the opening 28 in a direction extending longitudinally of the treadle is increased in each direction away from the longitudinal center of the opening. In other words, the opening 28 is flared outwardly in each direction from the longitudinal center thereof only in the dimension which parallels the longitudinal axis of the treadle. As a result, swinging or arcuate movement of the treadle 19 in a plane substantially parallel to the base 15 in either direction away from the illustrated set position thereof is permitted to the extent required to effect full release of the latching element 21 in the manner explained below. At the same time tipping of the treadle in either direction about the longitudinal axis of the bar 17 is prevented because the vertical dimension of the opening is only slightly greater than the diameter of the bar. For instance in one embodiment the bar 17 is 5/64 inch in diameter and the opening is 6/64 inch in a vertical direction. Preventing tipping of the treadle about its longitudinal axis makes for easier setting of the trap.

It will be noted that since the width of the treadle rib portion 23 is substantially less than the width of the upper transverse treadle part 22, the longitudinal cross-sectional dimension of the opening 28 at each end thereof need be only slightly greater than the corresponding dimension of the opening at the longitudinal center thereof in order to permit the swinging movement of the treadle which is required to effect full release of the latching element 21. Accordingly, this opening may be easily and simply formed by using small drills of like diameter to drill the treadle rib portion 23 transversely thereof along two lines which intersect at the center of this treadle part. Thus, the desired opening configuration may be obtained by two simple drilling operations easily capable of being performed in an automatic machine. In order to prevent the adjacent ends of the two spring coils 18 from interfering with the described swinging movements of the treadle 19, the upper transverse portion 22 of the treadle is constructed to have a width which is substantially less than the spaces between the indicated ends of the spring coils. With this arrangement, the possibility of binding engagement between the edges of the treadle part 22 and the inner turns of the coil springs is completely eliminated.

At its upper side, the treadle 19 carries a U-shaped catch member 24 which is adapted to cooperate with the free end of the latch element 21 to hold the striker bar 16 in a set position. More in detail, the catch 24 is in the form of a staple constructed of round wire and has legs 26b and 26c which straddle the transverse bar 17 and are driven into the treadle 19 from the upper surface thereof to be firmly anchored in the treadle. The transversely extending elevated part 26a of the catch member 24 is adapted to cooperate with the reversely bent end portion 27 of the wire latching element 21 to hold the striker bar 16 in its set position. Due to the engagement between the indicated portions of the two elements 24 and 21 and due further to the fact that the transverse portion 26a of the catch 24 is disposed at a slight angle relative to the treadle 19, this treadle is, in the set position of the trap, held at a slight angle relative to the base 15, thus providing adequate space between the free end of the treadle and the upper surface of the base to insure positive release of the latch element 21 in the event the free end of the treadle is pushed downwardly toward the base by a rodent.

Adjacent the free end thereof, the treadle 19 is provided with a bait receiving opening 29 which is cut downwardly from the upper surface of the treadle through the transversely extending treadle part 22 and partially into the vertical rib part 23 of the treadle. This opening is of a diameter slightly greater than the thickness of the vertical rib part 23, such that its lower end is only partially blocked by the uncut portion of the vertical rib 23. As a result, the opening 29 is open upon both sides of the vertical rib portion 23 at the under side of the transverse treadle portion 22. With this arrangement, the bait may be inserted within the opening 29 to be accessible to a rodent both from the top and under sides of the transverse treadle portion 22. Alternatively, the opening 29 may be used in conjunction with a string 29a to anchor a piece of bait partially within this opening. To this end, the string 29a may be passed around the transverse treadle part 22 through the opening 29 at the under side of this treadle part and tied around the piece of bait, all in the manner illustrated in Fig. 2 of the drawing.

In the assembly of the bait treadle 19 with the other parts of the trap as shown in Figs. 1 and 2 of the drawing, the jaw or striker bar 16, the spring coils 18, and the treadle 19 are all stacked together on the transverse bar 17, which is then staple connected to the base 15. In setting the trap, the spring biased striker bar 16 is manually moved to its set position as shown in Figs. 1 and 2 of the drawing, and is retained in this position while the locking portion 27 of the latch 21 is engaged with the catch member 24. Since the catch 24 is supported directly by its legs 26b and 26c; the latch locking portion 27 is freely movable across the top of the treadle and between the legs of the catch. With the latch locking portion 27 between the legs of the catch 24, the manual pressure on the striker bar 16 is gradually released until the latch locking portion 27 is moved by the jaw or striker bar 16 into locking engagement with the upper transverse part 26a of the catch.

As indicated above, the catch 27 and the latch element 21 are each constructed of wire or like material. Because of the round configuration of the engaging portions of these two members, a substantial line contact is provided therebetween which increases the sensitivity of the connection for release in response to movement of the free end of the bait treadle 19 in any direction. Thus, if the free end of the bait treadle is pivoted downwardly from the set position illustrated in Fig. 2 of the drawing to the position illustrated in Fig. 6 of the drawing, the undersurface portion 26e of the catch 24 co-acts with the engaging surface of the latch portion 27 to cam this latch portion downwardly from the position illustrated in Fig. 2 of the drawing until the locking engagement between the two parts 24 and 21 is broken. Similarly, if the free end of the treadle is lifted from its set position to the position shown in Fig. 5 of the drawing the undersurface portion 26d co-acts with the engaging portion of the latch part 27 to cam the two parts 21 and 24 out of engagement. Alternatively, if the free end of the treadle 19 is pivoted or swung in a counterclockwise direction from its set position to the position illustrated in Fig. 3 of the drawing, the leg 26b of the catch engages the adjacent portion of the latch part 27 to move the two parts 21 and 24 out of engagement. Finally, if the treadle is swung in a clockwise direction from its set position to the position illustrated in Fig. 4 of the drawing, the leg 26c engages the adjacent segment of the latch part 27 to effect disengagement of the two parts 21 and 24. Thus, it will be seen that the configuration of the opening 28 through the vertical leg 23 of the treadle 19 is such that release of the latch 21 may be effected by movement of the free end of the treadle 19 in any one of a plurality of directions away from the set position thereof. In this regard it is noted that the frictional engagement between the lower surface of this opening and the transverse bar 17 positively prevents sliding movement of the treadle 19 longitudinally along the transverse bar 17 when a force is applied in any direction to the free end of the treadle. Moreover, the relatively snug fit between the transverse bar and the longitudinal center of the opening 28 positively precludes bodily movement of the treadle 19 to any substantial extent in a direction longitudinally thereof.

In other words, the shape of the opening 28 in the rib 23 is such that the treadle 19 is free to pivot or swing on the bar 17 but will not tip transversely thereof thus assuring good latching. However, with the opening 28 flaring out as described from a restricted central portion, the treadle is restricted against movement in a direction longitudinally thereof, but operates with a sensitive camming action between the latch part 27 and the member 24 when the treadle is moved to either side in an arc, or up or down in a pivotal movement.

Along with the operating and assembly advantages of the bait treadle 19 as described above, the construction of this treadle lends itself to the economical manufacture of the treadle in quantity lots. Thus, in the manufacture of the treadles, a single length of wood material of substantially rectangular cross-section is operated upon to provide the T-shaped configuration, the metal catch members 24 are driven thereinto along one side thereof in longitudinally spaced relationship, the bait receiving openings 29 are drilled along the strip in longitudinally spaced relation corresponding to the spaced relation between the metal catch members 24, and the openings 28 are drilled in the vertical leg 23 in the manner explained above. Of course, the continuous strip is cut into lengths to form the individual bait treadles 19.

From the above explanation, it will be apparent that the present improved bait treadle is of simple and economical construction, is efficient and highly sensitive in operation, and well adapted for manufacture in quantity lots with a minimum number of operations, and at low cost. While only one embodiment of the invention has been disclosed it will be understood that various modifications may be made therein which are within the true spirit and scope of the invention as defined in the appended claims.

I claim:

1. In an animal trap having a striker bar and a transverse bar adapted to support the coiled actuating spring for said striker bar, an elongated one-piece wood treadle of T-shaped cross section having a transverse opening through the vertical portion of the T within which said transverse bar is received, said opening having a cross-sectional dimension substantially greater than the cross-sectional dimensions of the transverse bar throughout at least a portion of its length, and the upper transverse portion of the T having its edges spaced from the adjacent portions of said coil, whereby said treadle is adapted to swing through a substantial arc in a plane substantially parallel to the plane of said striker bar.

2. In a mouse trap having a striker bar and a transverse bar adapted to support the coiled actuating spring for said striker bar, an elongated one-piece wood treadle of T-shaped cross section throughout its length and having a bait receiving opening adjacent one end thereof which extends from the top surface of the treadle through the upper transverse portion of the treadle and has a cross-sectional dimension greater than the width of the vertical portion of the treadle, whereby said opening is only partially closed at the lower end thereof by said vertical portion of the treadle, said vertical portion of the treadle also having a transverse opening therethrough adjacent the other end of the treadle within which said transverse bar is received, said last mentioned opening having a cross-sectional dimension substantially greater than the cross-sectional dimension of said transverse bar throughout at least a portion of its length, and said upper transverse portion of said treadle having its edges spaced from the adjacent portions of said coil, whereby said treadle is adapted to swing through a substantial arc in a plane substantially parallel to the plane of said striker bar.

3. In an animal trap having a striker bar spring biased to move from a set position to a released position, a latch and a transverse supporting bar; an elongated one piece wood treadle of T-shaped cross section cooperable with said latch to hold said striker bar in a set position, said treadle having a transverse opening through the vertical portion thereof within which said transverse bar is received to support said treadle for pivotal movement in a plane substantially normal to the plane of said striker bar when said striker bar occupies either of said positions, and said opening having a cross-sectional dimension greater than the cross-sectional dimension of said transverse bar, whereby said treadle is also adapted for arcuate swinging movement through a substantial arc in a plane substantially parallel to the plane of said striker bar.

4. In a mouse trap having a striker bar spring biased to move from a set position to a released position, a latch and a transverse supporting bar; an elongated one piece wood treadle of T-shaped cross-section cooperable with said latch to hold said striker bar in a set position, said treadle having a transverse opening through the vertical portion thereof within which said transverse bar is received to support said treadle for pivotal movement in a plane substantially normal to the plane of said striker bar when said striker bar occupies either of said positions, and said opening having a cross-sectional dimension in a direction longitudinally of said treadle which is slightly greater at the longitudinal center of said opening than the corresponding dimension of said transverse bar in the same direction and increases in both directions away from said longitudinal center of said opening, whereby said treadle is also adapted to swing through a substantial arc in a plane substantially parallel to the plane of said striker bar when in the set position and yet is limited against extended movement longitudinally thereof.

5. In a mouse trap having a striker bar spring biased to move from a set position to a released position, a latch and a transverse supporting bar; an elongated one piece wood treadle of T-shaped cross-section cooperable with said latch to hold said striker bar in a set position, said treadle having a transverse opening through the vertical portion thereof within which said transverse bar is received to support said treadle for pivotal movement in a plane substantially normal to the plane of said striker bar when said striker bar occupies either of said positions, and said opening having a substantially uniform cross-sectional dimension in a direction normal to the longitudinal axis of said treadle which is only slightly greater than the corresponding dimension of said transverse bar, said opening also having a cross-sectional dimension in a direction longitudinally of said treadle which is slightly greater at the longitudinal center of said opening than the corresponding dimension of said transverse bar in the same direction and increases in both directions away from said longitudinal center of said opening, whereby said treadle is also adapted for arcuate swinging movement through a substantial arc in a plane substantially parallel to the plane of said striker bar when in the set position and yet is limited against extended movement longitudinally thereof.

6. In a mouse trap having a latch, an elongated one-piece wood treadle of T-shaped cross section cooperable with said latch to set the trap, said treadle having a bait receiving opening adjacent one end thereof which extends from the top surface of the treadle through the upper transverse portion of the treadle and has a cross-sectional dimension greater than the width of the lower vertical portion of the treadle, whereby said opening is only partially closed at the lower end thereof by said vertical portion of the treadle.

7. In an animal trap which includes a striker bar, a transverse supporting bar and a latch; a bait treadle cooperable with said latch to retain said striker bar in set position and comprising a wooden member of T-shaped cross-section having a top longitudinal portion and a rib extending longitudinally of the treadle below the top portion, said rib having a transverse opening therein to receive the supporting bar, thereby to support the treadle, said opening having a restricted central portion of only slightly greater diameter than said bar and a bore flaring outwardly in each of the two opposite axial directions from said central portion, each of said bores having a vertical dimension only slightly greater than said diameter and being progressively greater in radial dimension in a direction longitudinally of said treadle, whereby the wall defining said opening acts to prevent undesired tipping of said treadle about its longitudinal axis and to prevent longitudinal movement of said treadle while permitting arcuate swinging movement thereof to each side and pivotal up and down movement on said supporting bar, and means on said treadle for engaging said latch.

HERBERT A. STILSON.